July 28, 1953 — E. B. MILLER — 2,646,630
EDUCATIONAL SHOELACE
Filed March 6, 1950
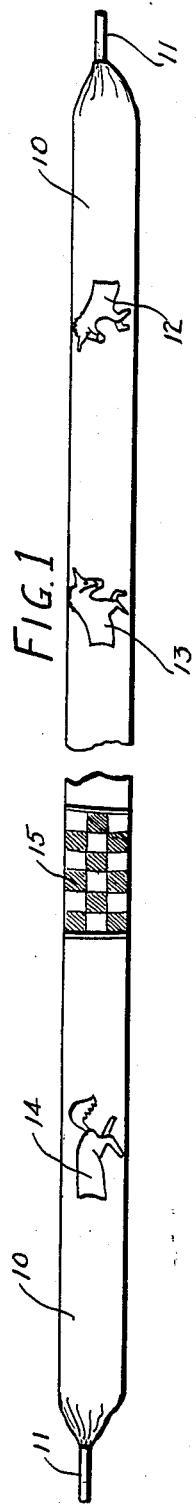
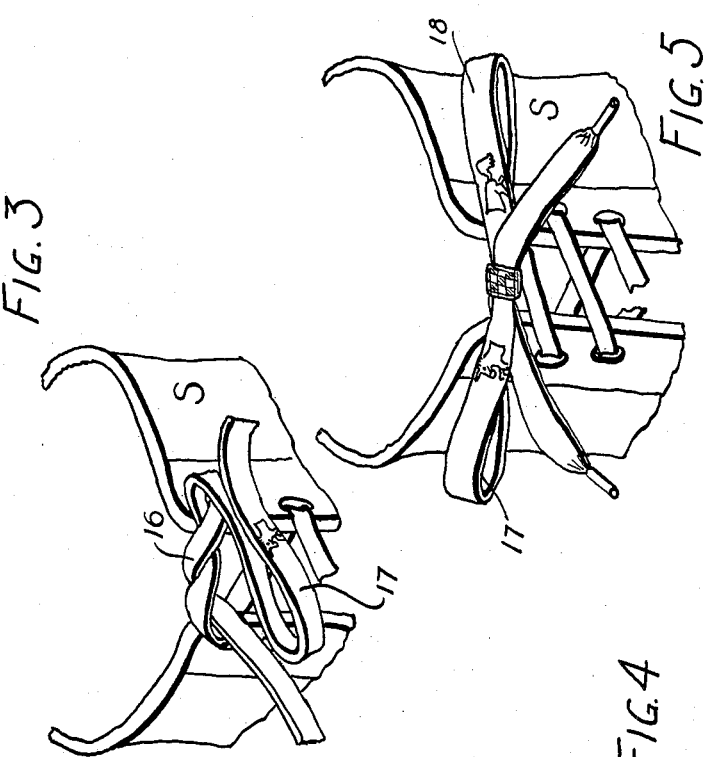
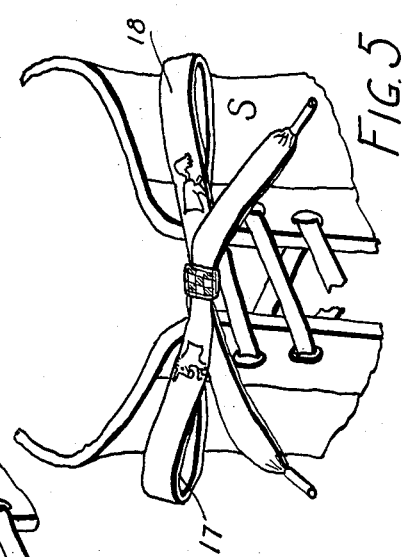
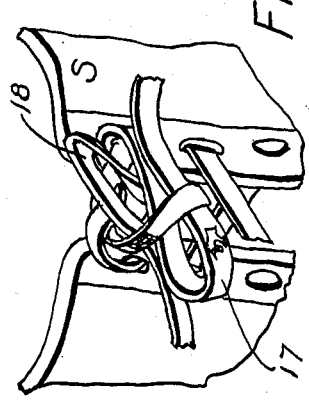
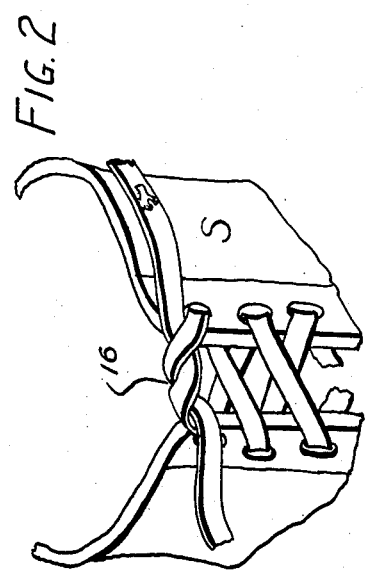
INVENTOR
Edna B. Miller
BY Adams + Bush
ATTORNEYS Patented July 28, 1953

2,646,630

UNITED STATES PATENT OFFICE 2,646,630

EDUCATIONAL SHOELACE

Edna Barlow Miller, Camp Lejeune, N. C.

Application March 6, 1950, Serial No. 147,875

2 Claims. (Cl. 35—1)

1

This invention relates to educational devices and has more particular reference to educational devices for teaching children how to tie bowknots, such as those made in tying shoe laces, bow ties, hair ribbons, and the like.

One object of the invention is to provide a novel educational device for teaching children how to tie bowknots.

Another object of the invention is to provide a device in the form of an elongated strip of material, such as a shoe lace, bow tie, hair ribbon, or the like having indicia in the form of markings or pictorial representations thereon appropriately spaced from the ends of the strip and from each other to act as manipulating guide markers in tying bowknots.

A further and more particular object is to provide an eductional shoe lace having pictorial representations thereon especially provided for teaching children how to tie a bowknot therein.

Other objects and advantages of the invention will appear in the following specification, when considered in connection with the accompanying drawing, wherein:

Fig. 1 is a plan view, with parts broken away, of a shoe lace embodying the invention, and Figs. 2, 3, 4, and 5 are fragmentary views showing the shoe lace of Fig. 1 applied to a child's shoe and illustrating successive steps in tying a double bowknot.

In general, the present invention comprises a device in the form of an elongated strip of material, such as a shoe lace, bow tie, hair ribbon, or the like, having indicia in the form of markings or pictorial illustrations thereon and appriately spaced from the ends of the strip and from each other to act as manipulating guide markers to show how the respective ends of the strip are to be manipulated in order to tie them into a bowknot.

It is difficult for some people to learn how to tie bowknots; particularly, for children to learn how to tie bowknots in their shoe laces. For the purpose of illustration, the invention will be described as applied to a shoe lace for teaching children how to tie bowknots therein.

Referring now to the drawing, there is shown, in Fig. 1, a shoe lace embodying the invention and comprising an elongated, flexible strip 10 having the usual metal tips 11 secured to each end and having spaced indicia or guide markers 12 and 13 on the right hand end portion, and indicia or guide markers 14 and 15 on the left hand end portion of the strip.

The elongated strip 10 may be made of any

2 suitable material such as plastic, leather, or cloth, and, in the case of a shoe lace, it may be provided with metal tips, if desired. In the particular embodiment of the invention illustrated, the lace is made of flat braided material.

The guide markers or indicia may be in the form of any kind of mark or pictorial illustration. In the illustrated example, each of the markers 12 and 13 is shown as being a pictorial representation of the front half of a horse; while the marker 14 is a pictorial representation of the rear half of a horse; and the marker 15 is a pictorial representation of a horse blanket. These markers or pictorial representations are applied to both sides of the strip and may be made in any suitable manner, such as by printing, painting, weaving, or by embroidering. Also, they may be suitably colored to make them contrast with the color of the shoe lace or strip. In the particular embodiment illustrated, the pictorial representations are printed on both sides of the lace in colors contrasting with the color of the lace. It will be noted that the markers 12 and 13 show the front part of a horse with the heads facing each other; while the marker 14 shows the rear end of the horse with the tail pointed toward the blanket 15. This arrangement of the illustrations is such as to teach a child how to form a bowknot by manipulating the right and left hand ends of the lace.

Figs. 2 to 5 inclusive, illustrate the successive steps in tying a bowknot in the shoe lace shown in Fig. 1, after it has been laced into a shoe S. In Fig. 2, the lace is shown as being tied into an ordinary single knot 16 with the ends extending in opposite directions. The next step in forming a double bowknot is illustrated in Fig. 3. In that illustration, the right hand end portion of the lace is shown as being folded upon itself to bring the two horses' heads together to form a bight or loop 17, ready to be tied by the left hand end portion of the lace. The next step, shown in Fig. 4, is to wrap the blanket portion 15 of the left hand end of the lace around the bight or loop 17 at a point just behind the horses' heads to simulate placing the blanket on the visible horse. Then, the left end portion of the lace is doubled upon itself adjacent to the horse's tail, leaving the tail visible and the bight, with the tail acting as a guide, is pulled or threaded through the bight formed by the applied blanket portion of the lace to form the second loop 18 of the double bowknot, as shown in Fig. 5. When the two loops 17 and 18 are pulled tight, it will be noted that the loops and ends of the lace will be of about the same length, thus providing a neat and symmetrical double bowknot. When a double bowknot is formed in the manner described, the horse's tail will appear on its bow loop 18 as pointing in the right direction relative to the head portion on the loop 17. The prescribed procedure will appeal to the mental faculties of any child. The successive steps involving matching the horse heads; placing the blanket; and threading the tail under the blanket, can easily be remembered, once the instructions are made clear. The spacings of the indicia are such as to make it possible for any person to tie double bow-knots in which the loops or bights are of uniform length and symmetrical appearance. Furthermore, the construction will enable a child to learn to tie bowknots in a fraction of the time ordinarily required for that purpose.

Obviously, the invention is not limited to the application of markers or indicia on shoe laces. It can be applied to the tying of bow ties, hair ribbons, dress sashes, and the like. Moreover, the markers or indicia may be in the form of any desired pictorial illustrations or suitable markings which serve the same purpose. It is contemplated that the pictorial illustrations may include a wide variety of mammalia, birds, insects, and the like, to appeal to children.

What is claimed is:

1. An educational shoe lace for teaching children to tie a bow knot having indicia in the form of pictorial representations on one end portion of the lace so spaced that when said end portion is folded upon itself to bring the indicia face to face a bow loop is formed; and having indicia also in the form of pictorial representations on the other end portion of the lace to provide a guide for threading said other end portion behind the loop to form a double bow knot, said pictorial representations being so spaced and fragmented that when the bow is properly tied a unitary pictorial representation is attained.

2. An educational shoe lace, as set forth in claim 1, wherein said first named indicia consists of a pair of spaced pictorial illustrations of the head portion of a horse with the horses' heads facing each other and said second named indicia consists of a pair of spaced pictorial illustrations of a horse blanket and the tail portion of a horse, respectively, with the illustration of the horse blanket farthest from the end of the lace, the arrangement of said illustrations being such as to teach the order in which the respective end portions of the lace are to be manipulated to form a symmetrical double bow knot.

EDNA BARLOW MILLER.

References Cited in the file of this patent

UNITED STATES PATENTS

| Number | Name | Date |
|---|---|---|
| 1,917,236 | Bloomstrand | July 11, 1933 |
| 2,145,137 | Sayers | Jan. 24, 1939 |
| 2,313,874 | Hume | Mar. 16, 1943 |
| 2,385,197 | Eisel | Sept. 18, 1945 |

OTHER REFERENCES

Montessori Hand Book, pages 22 and 23, 1912.
Montessori Method, pages 144–146, 1912.